US010670905B2

(12) United States Patent
Choi et al.

(10) Patent No.: US 10,670,905 B2
(45) Date of Patent: Jun. 2, 2020

(54) BLACK MATRIX STRUCTURES FOR DISPLAYS DEVICES

(71) Applicant: Microsoft Technology Licensing, LLC, Redmond, WA (US)

(72) Inventors: Minhyuk Choi, Sammamish, WA (US); Gangok Lee, Bothell, WA (US); Jignesh V Gandhi, Redmond, WA (US); Camilo Leon, Redmond, WA (US); Andrew N Cady, Kirkland, WA (US); Rajesh Dighde, Redmond, WA (US)

(73) Assignee: Microsoft Techonology Licensing, LLC, Redmond, WA (US)

( * ) Notice: Subject to any disclaimer, the term of this patent is extended or adjusted under 35 U.S.C. 154(b) by 0 days.

(21) Appl. No.: 15/430,344

(22) Filed: Feb. 10, 2017

(65) Prior Publication Data
US 2018/0231827 A1     Aug. 16, 2018

(51) Int. Cl.
*G02F 1/1335* (2006.01)
*G02F 1/1339* (2006.01)
*G02F 1/1368* (2006.01)
*G02F 1/13357* (2006.01)

(52) U.S. Cl.
CPC ...... *G02F 1/133512* (2013.01); *G02F 1/1368* (2013.01); *G02F 1/133514* (2013.01); *G02F 1/133516* (2013.01); *G02F 1/133603* (2013.01); *G02F 1/13394* (2013.01)

(58) Field of Classification Search
CPC ........ G02F 1/133512; G02F 1/133514; G02F 1/133516; G02F 1/13394
See application file for complete search history.

(56) References Cited

U.S. PATENT DOCUMENTS 5,495,354 A * 2/1996 Jo .................. G02F 1/133516
                                                        349/106
5,831,701 A   11/1998 Matsuyama et al.
6,124,910 A    9/2000 Nishida et al.
(Continued)

FOREIGN PATENT DOCUMENTS

CN     105278145 A    1/2016
WO     2014166151 A1  10/2014

OTHER PUBLICATIONS

Harrison, et al., "Innovative Laser Patterning of Black Matrix for LCD Manufacture", In Journal of SID Symposium Digest of Technical Papers. vol. 39. No. 1., May, 2008, 4 pages.
(Continued)

*Primary Examiner* — Jessica M Merlin
(74) *Attorney, Agent, or Firm* — Arent Fox LLP (57) ABSTRACT

Described are examples of display devices including a display panel comprised of a transparent layer, a color filter layer adjacent to the transparent layer, wherein the color filter layer comprises a matrix of colored light filters, and a black matrix layer comprising a base portion disposed on the transparent layer between two of the different colored light filters and an extension portion that extends into the color filter layer between the two colored light filters to block a light path that may otherwise traverse both of the two colored light filters. The base portion and the extension portion differ in a height dimension that is substantially perpendicular to the transparent layer.

20 Claims, 10 Drawing Sheets

(56) References Cited

U.S. PATENT DOCUMENTS

| | | | | |
|---|---|---|---|---|
| 6,140,988 | A * | 10/2000 | Yamada | G02F 1/133512 |
| | | | | 345/60 |
| 6,806,925 | B2 * | 10/2004 | Ishii | G02F 1/133516 |
| | | | | 106/31.27 |
| 8,581,878 | B2 | 11/2013 | Chen et al. | |
| 2003/0076572 | A1 | 4/2003 | Kawase | |
| 2006/0043888 | A1 | 3/2006 | Nakagawa et al. | |
| 2007/0052900 | A1 | 3/2007 | Cho et al. | |
| 2008/0018836 | A1 * | 1/2008 | Huh | G02F 1/133516 |
| | | | | 349/106 |
| 2009/0273720 | A1 * | 11/2009 | Tanaka | G02F 1/133512 |
| | | | | 348/790 |
| 2010/0231843 | A1 * | 9/2010 | Tadaki | G02F 1/133377 |
| | | | | 349/156 |
| 2010/0302497 | A1 | 12/2010 | Chang | |
| 2013/0155353 | A1 | 6/2013 | Ma et al. | |
| 2013/0222723 | A1 | 8/2013 | Kim et al. | |
| 2013/0329152 | A1 * | 12/2013 | Zhong | G02F 1/133377 |
| | | | | 349/43 |
| 2016/0252768 | A1 | 9/2016 | Zhong et al. | |
| 2016/0320882 | A1 | 11/2016 | Kim et al. | |

OTHER PUBLICATIONS

"Color Filters for LCDs", https://www.toppan.co.jp/english/products_service/pdf/CF.pdf, Retrieved on: Nov. 28, 2016, pp. 9-10.

"International Search Report and Written Opinion Issued in PCT application No. PCT/US2018/016539", dated May 15, 2018, 16 Pages.

* cited by examiner

BLACK MATRIX STRUCTURES FOR DISPLAYS DEVICES

BACKGROUND

Display devices, such as liquid crystal display (LCD) display devices, light emitting diode (LED) backlit display devices, etc., are generally comprised of multiple layers, which typically include a frame, an LCD panel, a backlight or lamp (which may include an LED, organic LED (OLED), or backlight), a reflector, one or more diffusers, etc., where the backlight or lamp illuminates color pixels in the LCD panel to generate color images on the LCD panel. The LCD panel within the display device is typically comprised of a color filter layer (composed of red, green and blue color filters) deposited on a glass layer (typically the front glass layer) and a thin film transistor (TFT) layer (typically the back glass layer). Light from the backlight or lamp passes through the LCD panel and is modulated appropriately by the liquid crystal layer between the two glass layers. The modulation of the light is controlled by the voltage applied to the liquid crystal with the TFT glass. The light then passes through the color filters (e.g., red, green, blue colored light filters) of the color filter layer from the back glass layer, and the colors from the color filter layer can be visible from the front glass layer.

In addition, the LCD panel can include a black matrix layer in the form of a flat strip of insulating material disposed in a matrix pattern on an inside surface of the front glass layer to fill areas between colored light filters in the color filter layer and adjacent to the front glass layer. Typically, the black matrix layer is disposed on the front glass layer, followed by the color filter layer on top of the black matrix layer. For a given color filter in the color filter layer, the black matrix layer in the form of a flat strip may not block some light paths from adjacent colored light filters when viewed at an angle. As there is a desire to decrease the width of the black matrix layer for high resolution displays and/or to achieve a high aperture ratio, the current black matrix layer structures may lead to off-axis color shift and a reduced quality of the color image when viewed from an angle.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a display device is provided that includes a transparent layer, a color filter layer adjacent to the transparent layer, where the color filter layer comprises a matrix of colored light filters, and a black matrix layer comprising a base portion disposed on the transparent layer between two of the different colored light filters in the matrix of colored light filters and an extension portion that extends into the color filter layer between the two colored light filters. The base portion and the extension portion differ in a height dimension that is substantially perpendicular to the transparent layer.

In another example, a method for constructing a liquid crystal display (LCD) layer of a display device is provided. The method includes disposing a black matrix layer on a transparent layer, wherein the black matrix layer includes an insulating material for blocking light, modifying the black matrix layer to include at least a base portion having a first width, and an extension portion having a second width, wherein the first width is different from the second width, and disposing two different colored light filters of a matrix of colored light filters to define a color filter layer on the transparent layer and between the base portion and the extension portion of the black matrix layer.

In another example, a computing device is provided including at least one processor and a memory, and a display panel. The display panel includes a transparent layer, a color filter layer adjacent to the transparent layer, wherein the color filter layer comprises a matrix of colored light filters, and a black matrix layer comprising a base portion disposed on the transparent layer between two different colored ones of the matrix of colored light filters and an extension portion that extends into the color filter layer between the two different colored ones of the matrix of colored light filters, where the base portion and the extension portion differ in a height dimension that is substantially perpendicular to the transparent layer. The computing device also includes a display controller coupled to the at least one processor and configured to provide one or more images to the display panel.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples of black matrix layers, and operations for constructing the black matrix layers, for use in display devices to block multiple light paths for one or more colored light filters in a color filter layer. For example, the black matrix layer can be disposed at least partially between the color filter layer and a transparent layer to fill an area between two colored light filters. For example, the black matrix layer can extend at least halfway through the color filter layer to block an angular light path between adjacent colored light filters. In one example, the black matrix layer can be composed of multiple portions to block the light paths, where the multiple portions may include a base portion having a first width and first height (e.g., a height relatively perpendicular to the transparent layer), and one or more extension portions having a second width, which is different from the first width, and a second height to extend through at least a portion of the color filter layer (e.g., at least halfway, all of the way, beyond the color filter layer).

In some examples, the black matrix layer can be constructed of the multiple portions, which can include disposing the base portion at the first width and height on a transparent layer of a display device panel, and then creating an extension portion at the second width and height on top of the base portion to extend into the color filter layer. For example, the different portions can be created by using an ultraviolet (UV) photolithographic ("photo") process on the black matrix layer, by disposing the extension portion as a separate layer onto the base portion, by etching the black matrix layer to yield the base portion and extension portion, etc. In any case, the color filter layer can be disposed over the black matrix layer, such that the color filter layer is adjacent to portions of the black matrix layer and to portions of the transparent layer that are between the portions of the black matrix layer. In other words, the black matrix layer fills areas between the colored light filters. The black matrix layer can accordingly block light paths between the colored light filters even when the display is viewed at an angle.

The structure of the black matrix layer as described in this disclosure may reduce or eliminate one or more problems that exist in existing LCD displays. These problems can include off-axis angle color shift, which corresponds to reduction in the uniformity of white image when viewed off-axis. In this case, the image becomes white or grayscale with all the sub-pixels on. Such non-uniformity can occur when more light passes through neighboring pixels in one direction compared to the other. This can cause one side to look brighter than the other. With this problem, different locations of the display can have different alignment and hence can cause different brightness in different areas when viewed off-axis. Additional problems include color washout caused by the viewing angle being impacted by neighboring color filters, contact pooling, and/or edge pooling. Moreover, plastic LCD displays that have a flexible housing and display, LCDs having thin or flexible glass, and/or curved LCD displays may also exhibit such problems, and the problems may be exacerbated due to flexing or curving of the display. The problems can be mitigated or solved by having the black matrix layer structured as described herein.

Figure 7:
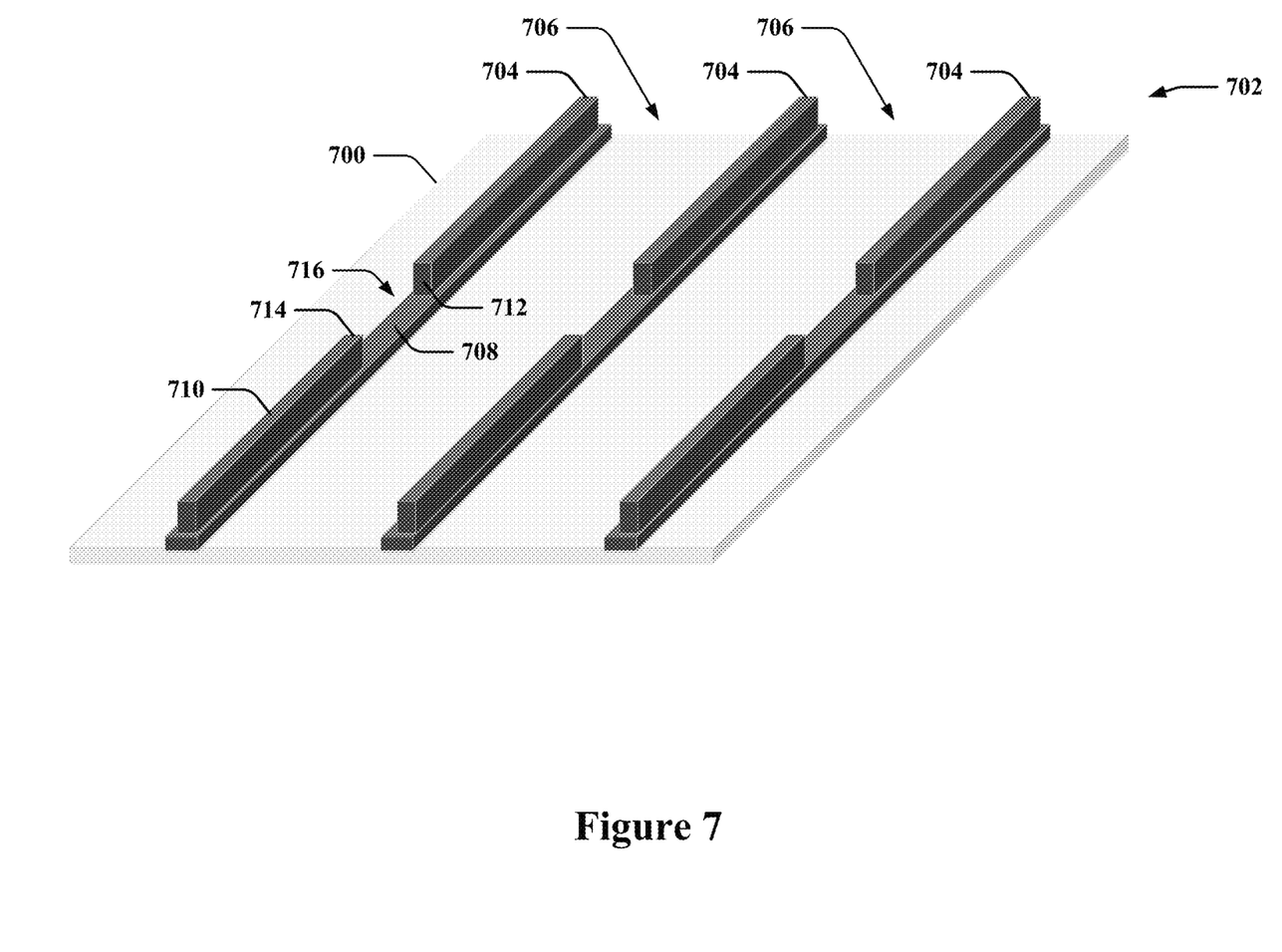
FIG. 7 illustrates a perspective view of an example black matrix layer disposed on a transparent layer.
Figure 8:
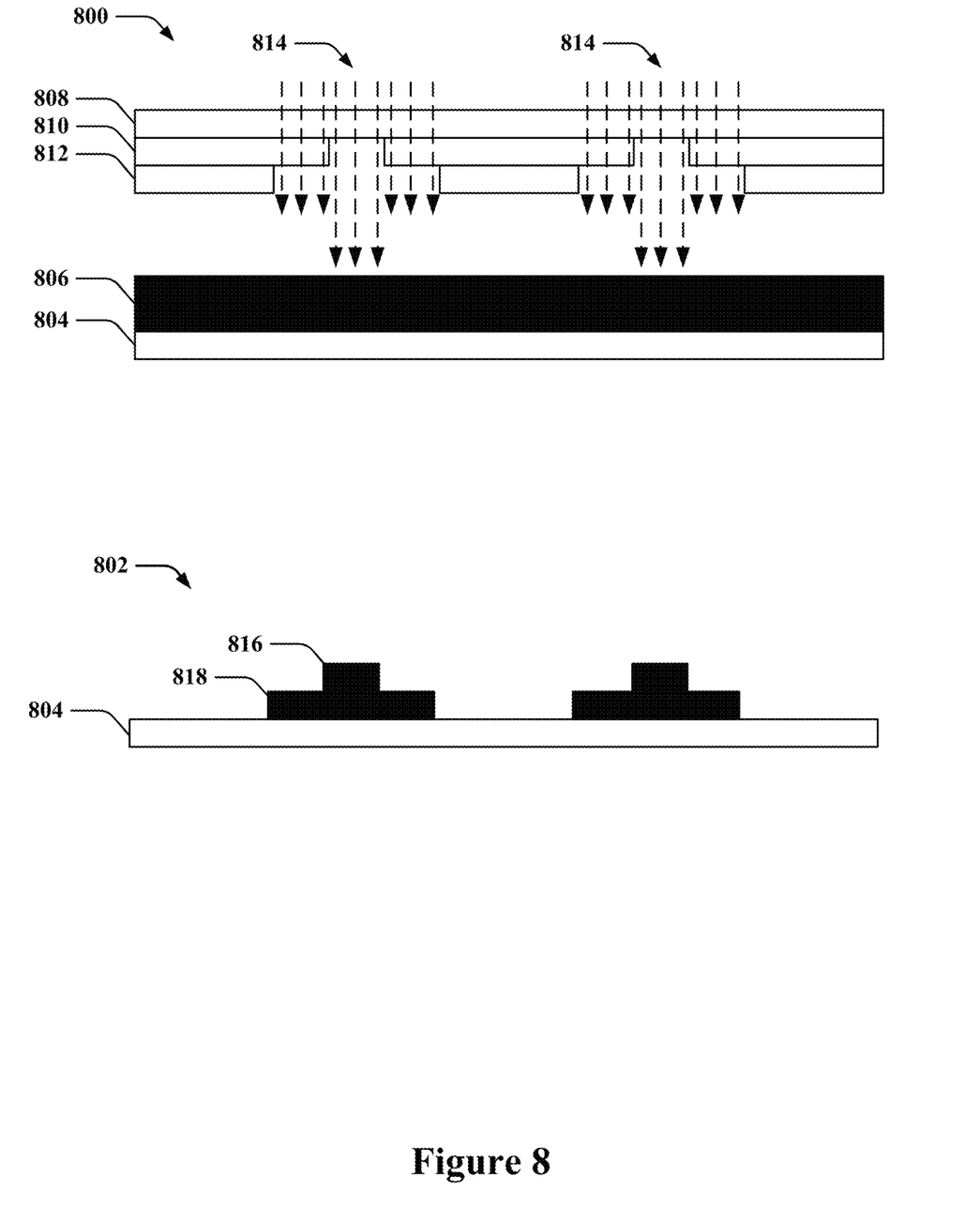
FIG. 8 illustrates an example cross-section view of layers of a display panel constructed in accordance with examples described herein.
Figure 9:
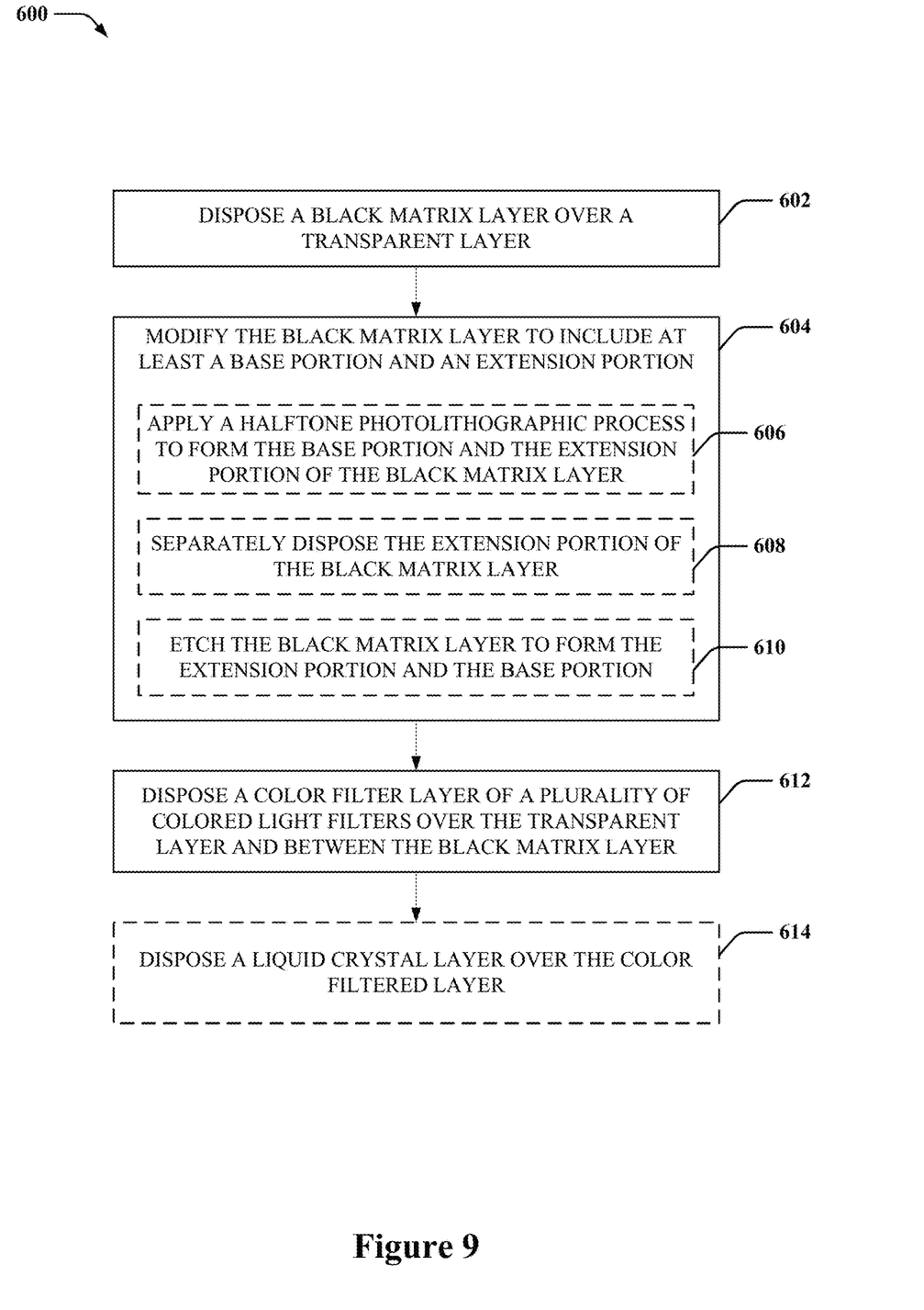
FIG. 9 is a flow diagram of an example of a method for constructing a display panel in accordance with examples described herein.

Turning now to FIGS. 1-10, examples are depicted with reference to one or more components and one or more methods that may perform the actions or operations described herein, where components and/or actions/operations in dashed line may be optional. Although the operations described below in FIG. 9 are presented in a particular order, the ordering of the actions and the components performing the actions may be varied, in some examples, depending on the example. Moreover, in some example operations, one or more of the actions and/or functions may be performed by a specially-programmed processor, a processor executing specially-programmed software or computer-readable media, or by any other combination of a hardware component and/or a software component capable of performing the described actions or functions.

Figure 1:
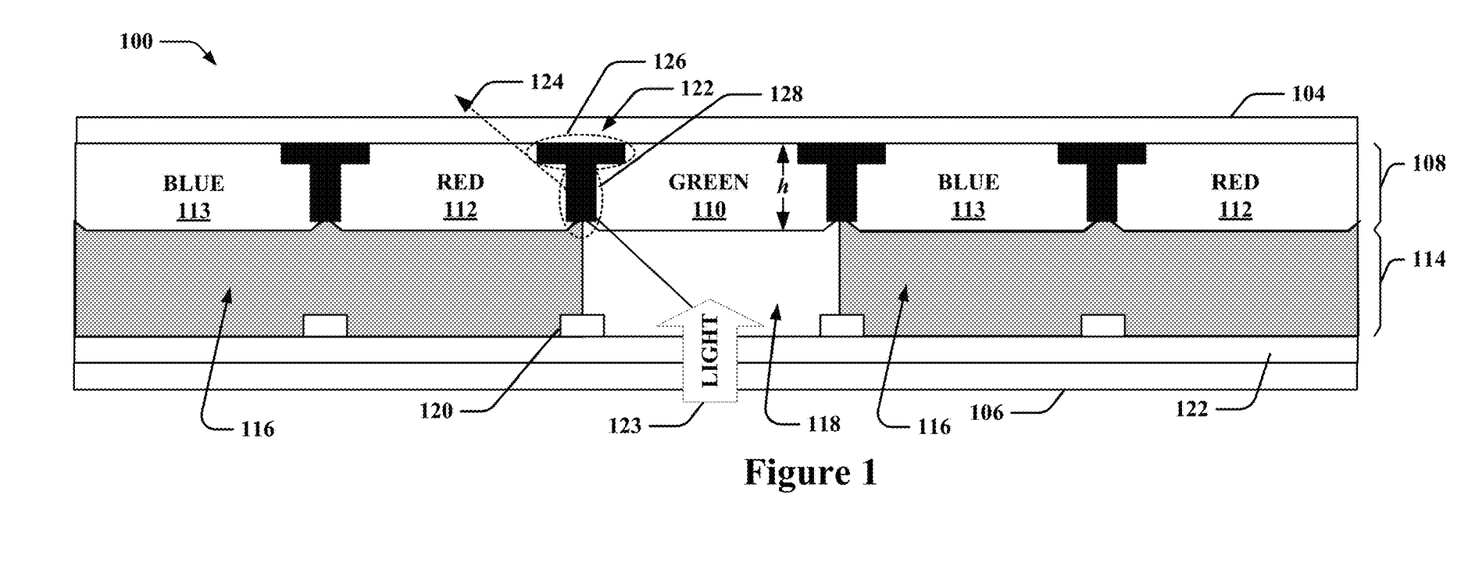
FIG. 1 illustrates a partial cross-sectional view along line 156 of an example of a display panel of a display device, wherein the display panel is constructed with a black matrix layer in accordance with examples described herein.

FIG. 1 illustrates a partial cross-sectional view of an example of a display panel 100 for a display device 150. In an example, display device 150 may be an LCD display device or one or more variants thereof, such as light emitting diode (LED) backlit LCD display devices, organic LED (OLED) backlit LCD display devices, etc. In this regard, the display panel 100 may be housed in a housing of an LCD display device along with one or more other components, such as a backlight 158 (shown schematically in display device 150) for providing light 123, one or more reflectors, one or more diffusers, one or more prisms, one or more polarizers, one or more light guides, or one or more glass (or other transparent material) layers, etc. An example display device 150 can include a housing 152 and a display area 154, where the housing can substantially enclose one or more components for operating the display device 150 (e.g., a processor, memory, bus, or other electronic components) and/or the display panel 100 of the display device 150. The display area 154 can include at least a portion of display panel 100, where a transparent layer 104 can be, or can be located adjacent to, an outward facing (e.g., relative to display device 150) surface of the display area 154 such that a backlight or lamp can illuminate one or more color filters of the display panel 100, as described below, to generate one or more images in the display area 154. In other examples, the display device 150 may be a plastic LCD display where the housing 152 may not be rigid, and flexing of the housing 152, and thus of display area 154 and the associated components described below, may be possible. Moreover, in this regard, the transparent layer 104 may be of substantially any suitable thickness, and may include thin or flexible glass, etc. Additionally, in an example, the display device 150 may be a curved LCD where the housing 152, display area 154, etc. are curved with respect to one or more axes.

For example, display panel 100 is shown in a partial cross-sectional view along line 156 of the display device 150 that may include the display panel 100 (note: for clarity, other layers and/or details of the display device 150 are omitted from this cross-sectional view). Additional examples of display panels are depicted in FIGS. 2-6, and are shown in partial cross-sectional views along line 156 of the example display device 150.

In an example, display panel 100 can include transparent layers 104, 106, which can be composed of glass or other at least partially transparent materials to allow light passage through the transparent layers 104, 106. Display panel 100 can also include a color filter layer 108 including multiple colored light filters, which can be red colored light filters 112, green colored light filters 110, or blue colored light filters 113, in one example, and may be arranged in columns of similar colors in a matrix pattern within the display panel 100. For example, the three color filters in this example can correspond to sub-pixels of a plurality of pixels of the display device 150 (e.g., 3840 pixels by 2560 lines (9.8 megapixels in a 3:2 aspect ratio) for a 4K ultra high definition (UHD) display). Display panel 100 may also include a liquid crystal layer 114 having a liquid crystal material that may be actuated (switched on or off) by a TFT layer 122 to define a plurality of chambers, e.g., a chamber corresponding to each colored light filter in the color filter layer 108, for allowing or blocking the passage of light.

For example, in operation, the liquid crystal layer 114 may include chambers 116 with the liquid material in a first state and chambers 118 with the liquid material in a second state, where the first state and second state can correspond to different phases or structures of the liquid crystal material that may allow different levels of light passage to the corresponding colored light filter(s) of the color filter layer 108. The liquid crystal layer 114 may be operated by electrodes 120, which may be electrodes functioning as part of an electrode layer 122 (e.g., a thin film transistor (TFT) layer) for conducting electricity to control the state of the liquid crystal in the corresponding chamber (e.g., by applying one or more voltages to the electrodes 120). For example, the electrodes 120 may also be referred to as data lines in a TFT layer. Accordingly, in one example, light 123 (e.g., from a backlight 158, such as a LED, OLED, lamp or other light source) can pass through transparent layer 106 of the display panel 100, and the electrodes 120 can modify the state of the liquid crystal in corresponding chambers of the liquid crystal layer 114 that are aligned with colored light filters in the color filter layer 108 to allow or not allow (or allow to a certain degree) light from the transparent layer 106 to pass through a colored light filter and out through transparent layer 104 for viewing on the display device 150.

Display panel 100 may also include a black matrix layer 122 disposed between two different colored light filters (e.g., colored light filters 110, 112) of the color filter layer 108 to fill areas between the colored light filters. For example, the black matrix layer 122 can be composed of a black (or other suitable color) resinous material for blocking light paths between colored light filters, as described herein. In one example, the black matrix layer 122 can be composed of a flexible material to facilitate flexing of the display panel 100 in certain configurations (e.g., for plastic or curved LCD). Conventional black matrix layers are typically of a single height, where the height is constant in a substantially perpendicular direction from the transparent layer (e.g., such as only base portion 126 of black matrix layer 122), and may not block angular light paths that traverse multiple colored light filters, such as light path 124 traversing colored light filters 110 and 112. Thus, when viewed at an angle corresponding to light path 124, a display panel having a conventional black matrix layer may display a mixed color, e.g., a green and red colored pixel, when only green is to be displayed.

Display panel 100, however, includes the black matrix layer 122 with an extension portion 128 that extends at another height dimension through the color filter layer 108 between two different colored light filters, e.g., colored light filters 110, 112, to block angular light paths, such as light path 124, when the display panel 100 is viewed at an angle. In an example, the black matrix layer 122 can be designed at a height dimension computed as a function of a height of the color filter layer 108 and a desired maximum viewing angle such that the edge of the black matrix layer 122 extending into the color filter layer 108 can block light paths at the maximum viewing angle, which may be indicated in or required by the display design specification.

For example, the black matrix layer 122 can include the extension portion 128, having a different width than base portion 126, and a height, h, that extends a distance through at least a portion of the color filter layer 108 sufficient to achieve a desired angular light path blocking. Thus, the extension portion 128 adds another height dimension in a substantially perpendicular direction from the transparent layer 104 and into the color filter layer 108. In one example, the black matrix layer 122, including portions 126 and 128, can extend at least halfway through the color filter layer 108 (e.g., at a height corresponding to at least half of a height, h, of colored light filters 112 in the color filter layer 108). In another example, black matrix layer 122 can extend completely through the color filter layer 108 and/or beyond the color filter layer 108.

In an example, as described further herein, in constructing the display panel 100 the black matrix layer 122 can be disposed onto the transparent layer 104, which may include disposing the black matrix layer 122 (e.g., in portions) as a layer with a single height along an entire width of the black matrix layer and then modifying the black matrix layer 122 to achieve a "T" shaped cross-sectional structure (e.g., by applying a UV photo process or etching the single height to achieve the base and extension portions of different width dimensions and having their own height dimensions). In another example, the black matrix layer 122 can be disposed onto the transparent layer 104 in multiple passes, where each pass can dispose the material at its own height (and/or at different widths). For example, base portion 126 can be disposed, and then extension portion 128 can be disposed on top of base portion 126. In any case, the color filter layer 108 can then be disposed over the transparent layer 104 and black matrix layer 122 to fill in the colored light filters such that the colored light filters (e.g., green colored light filter 110, red colored light filter 112, and blue colored light filter 113) are adjacent to portions of the black matrix layer 122 and portions of the transparent layer 104 between the portions of the black matrix layer 122. The liquid crystal chambers 116, 118 can then be constructed and filled with the liquid crystal material, etc.

Figure 2:
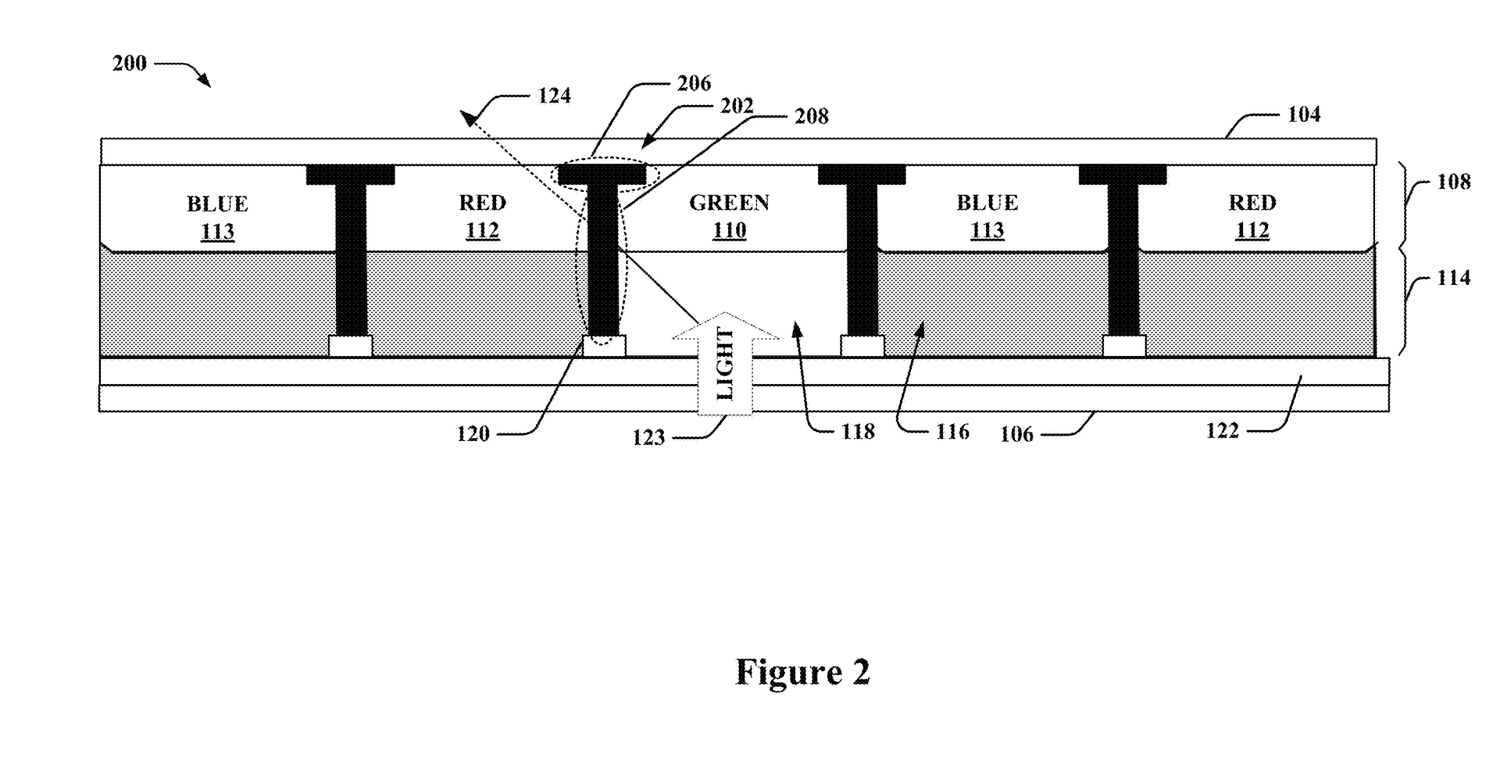
FIG. 2 illustrates a partial cross-sectional view of an additional example of a display panel with a black matrix layer constructed to extend to an electrode layer in accordance with examples described herein.

FIG. 2 illustrates a partial cross-sectional view of an additional example of a display panel 200 for a display device 150. Display panel 200 can include transparent layers 104, 106, color filter layer 108 having colored light filters 110, 112, 113, and liquid crystal layer 114 having chambers 116, 118, and electrodes 120, which are part of the electrode layer 122, as described above with respect to display panel 100 in FIG. 1.

Display panel 200 can include a black matrix layer 202 having a similar structure as black matrix layer 122 of display panel 100, where the extension portion 208 can extend from base portion 206 (e.g., which can be similar to base portion 126 of black matrix layer 122) through the color filter layer 108 to electrodes 120 to block light path 124. As described, for example, in constructing the display panel 200, the black matrix layer 202 can be disposed onto the transparent layer 104, which may include disposing the black matrix layer 202 as a layer with a single height along an entire width of the black matrix layer and then modifying the black matrix layer 202 to achieve a "T" cross-sectional shaped structure (e.g., by applying a UV photo process or etching the layer to achieve the base and extension portions with different widths and independent height dimensions). In another example, the black matrix layer 202 can be disposed onto the transparent layer 104 in multiple passes, where each pass can dispose the material at the height dimension of the portion (e.g., base portion 206 can be disposed at a first height dimension, and then extension portion 208 can be disposed on top of base portion 206 at a second height dimension).

Figure 3:
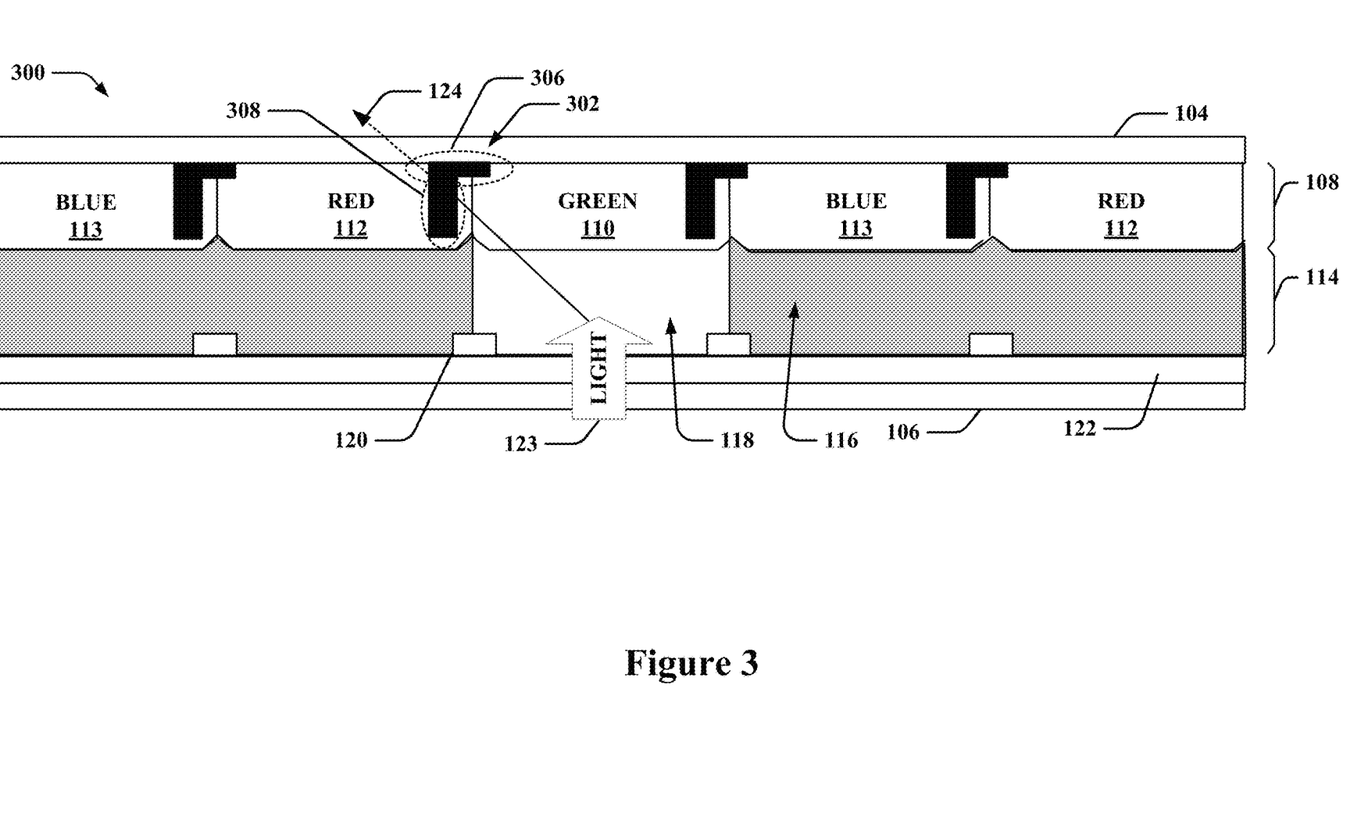
FIG. 3 illustrates a partial cross-sectional view of an additional example of a display panel with a black matrix layer constructed with a first layer having a first height, and a second layer offset from a center of the first layer and having a second height in accordance with examples described herein.

FIG. 3 illustrates a partial cross-sectional view of an additional example of a display panel 300 for a display device 150. Display panel 300 can include transparent layers 104, 106, color filter layer 108 having colored light filters 110, 112, 113, and liquid crystal layer 114 having chambers 116, 118, and electrodes 120, which are part of the electrode layer 122, as described above with respect to display panel 100 in FIG. 1.

Display panel 300 can include a black matrix layer 302 having a similar structure as black matrix layer 122 of display panel 100, where the extension portion 308 (which can be similar to extension portion 128 of black matrix layer 122) is offset from a center of base portion 306 (which can be similar to base portion 126 of black matrix layer 122). In an example, as shown, extension portion 308 of black matrix layer 302 can be disposed at an edge of base portion 306 to block light path 124. For example, extension portion 308 can be disposed at either edge of base portion 306 and/or at substantially any position along the width of base portion 306 (e.g., at an off-center position relative to a width of the base portion 306) sufficient to block light path 124 and/or other light paths. When constructing the display panel 300, the black matrix layer 302 can be disposed onto the transparent layer 104, which may include disposing the black matrix layer 302 as a layer with a single height along an entire width of the black matrix layer and then modifying the black matrix layer 302 to achieve a "L" or reverse "L" cross-sectional shaped structure (e.g., by applying a UV photo process or etching the layer to achieve the base and extension portions with different widths and independent height dimensions). In another example, the black matrix layer 302 can be disposed onto the transparent layer 104 in multiple passes, where each pass can dispose the material at the height dimension of the portion (e.g., base portion 306 can be disposed at a first height dimension, and then extension portion 308 can be disposed on top of base portion 306 at a second height dimension).

Figure 4:
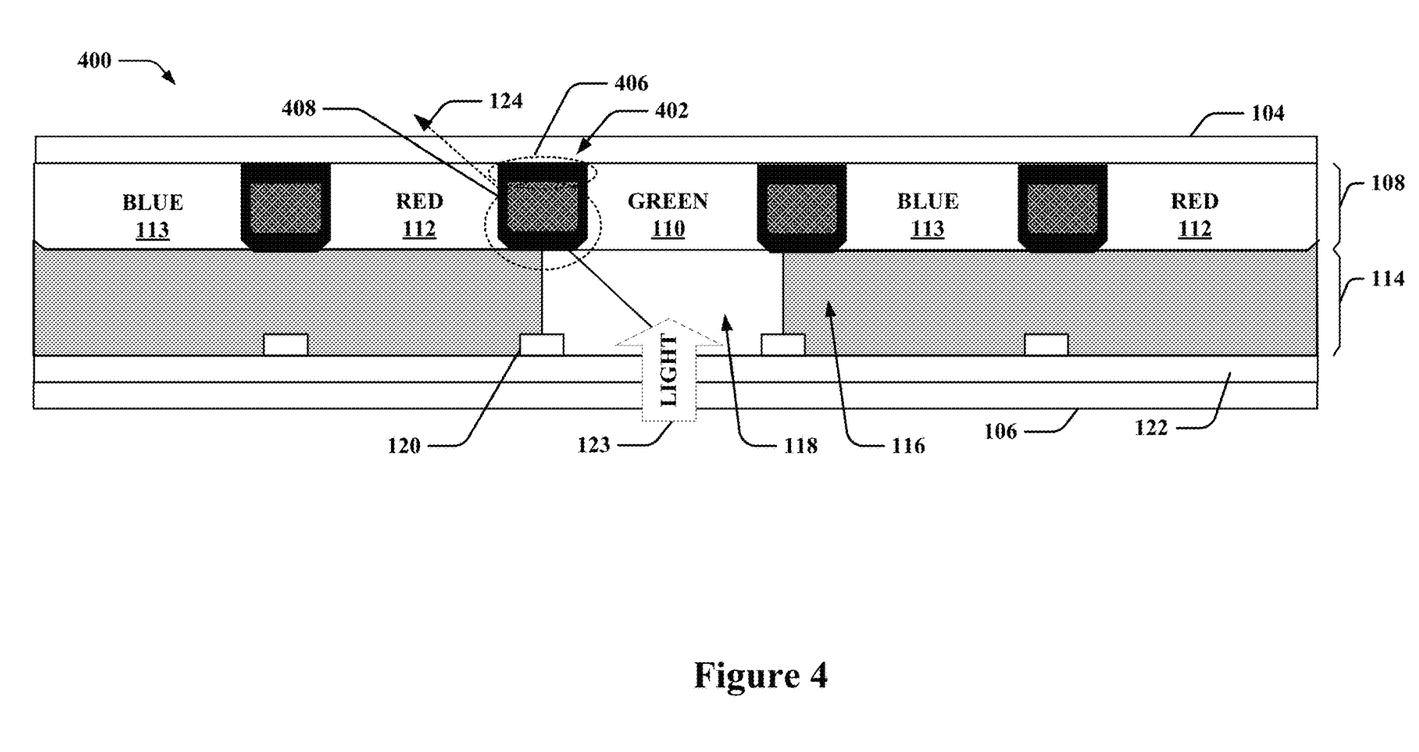
FIG. 4 illustrates a partial cross-sectional view of an additional example of a display panel with a black matrix layer constructed in a "U" shape in accordance with examples described herein.

FIG. 4 illustrates a partial cross-sectional view of an additional example of a display panel 400 for a display device 150. Display panel 400 can include transparent layers 104, 106, color filter layer 108 having colored light filters 110, 112, 113, and liquid crystal layer 114 having chambers 116, 118, and electrodes 120, which are part of the electrode layer 122, as described above with respect to display panel 100 in FIG. 1.

Display panel 400 can include a black matrix layer 402 including base portion 406 (which can be similar to base portion 126 of black matrix layer 122) and extension portion 408 extending from base portion 406. For example, extension portion 408 can be of a similar width as base portion 406 and can extend through the color filter layer 108 in a height dimension. In addition, the black matrix layer 402 can have a "U" shaped cross section with chamfered, rounded, flat, or other edges. Moreover, base portion 406 can be composed of three or more walls such that a center is hollow or filled. As shown, black matrix layer 402 can also block light path 124 and/or other light paths from passing through multiple colored light filters, such as colored light filters 110, 112, at different viewing angles. When constructing the display panel 400, the black matrix layer 402 can be disposed onto the transparent layer 104, which may include disposing the black matrix layer 402 as a layer with a single height along an entire width of the black matrix layer and then modifying the black matrix layer 402 to achieve a "U" shaped cross sectional structure (e.g., by applying a UV photo process or etching the layer to etch the corners). In another example, the black matrix layer 402 can be disposed onto the transparent layer 104 in multiple passes, where each pass can dispose the material at the height dimension of a portion (e.g., base portion 406 can be disposed at a first height dimension, and then extension portion 408 can be disposed on top of base portion 406 at a second height dimension, as an open-ended structure to achieve the hollow center or as a completely filled block).

Figure 5:
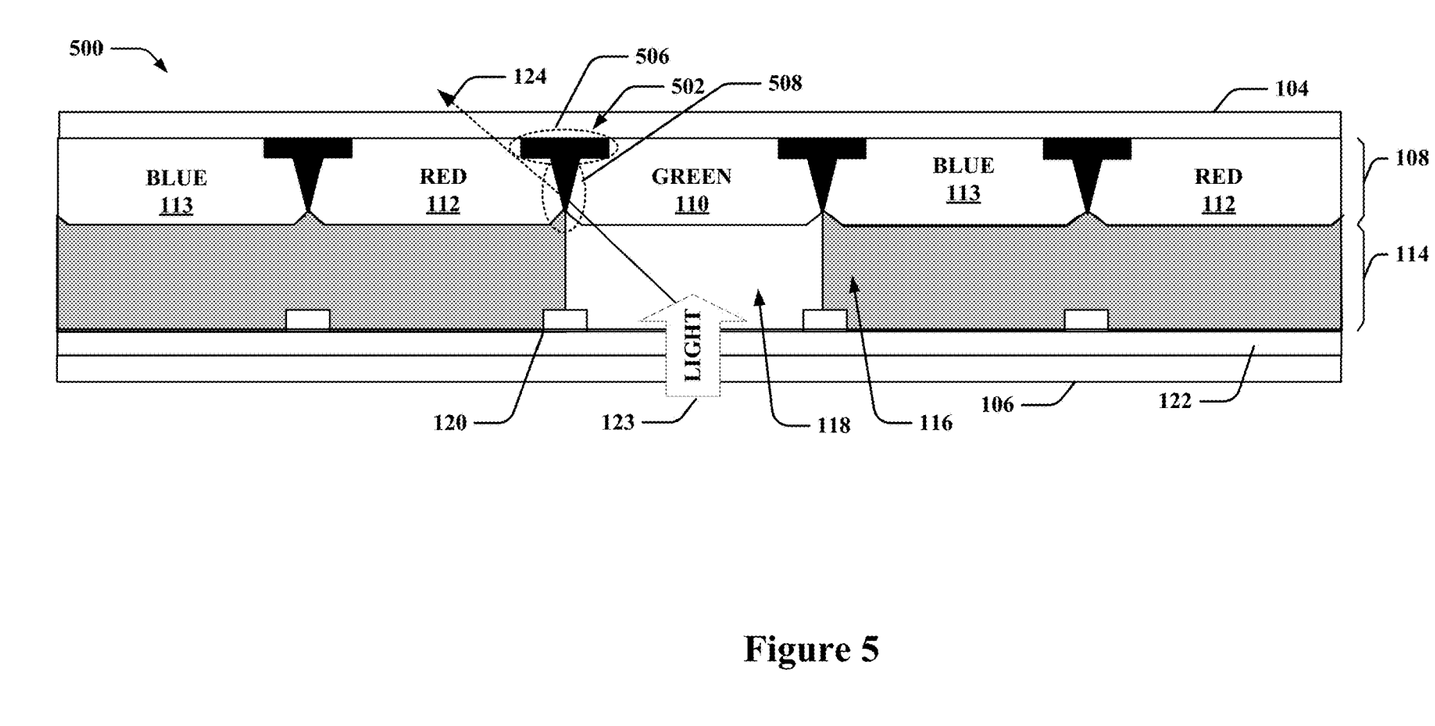
FIG. 5 illustrates a partial cross-sectional view of an additional example of a display panel with a black matrix layer constructed with a first layer having a first height, and a second layer having a second height and extending in triangular shape from the first layer in accordance with examples described herein.

FIG. 5 illustrates a partial cross-sectional view of an additional example of a display panel 500 for a display device 150. Display panel 500 can include transparent layers 104, 106, color filter layer 108 having colored light filters 110, 112, 113, and liquid crystal layer 114 having chambers 116, 118, and electrodes 120, which are part of the electrode layer 122, as described above with respect to display panel 100 in FIG. 1.

Display panel 500 can include a black matrix layer 502 having a similar structure as black matrix layer 122 of display panel 100, where the extension portion 508 is of a triangular shape from a center of base portion 506 (which can be similar to base portion 126 of black matrix layer 122). In an example, as shown, extension portion 508 of black matrix layer 502 can be disposed on base portion 506 to block light path 124. When constructing the display panel 500, the black matrix layer 502 can be disposed onto the transparent layer 104, which may include disposing the black matrix layer 502 as a layer with a single height along an entire width of the black matrix layer and then modifying the black matrix layer 502 to achieve the triangular shape of extension portion 508 (e.g., by applying a UV photo process or etching the layer to achieve multiple layers with different widths and independent height dimensions). In another example, the black matrix layer 502 can be disposed onto the transparent layer 104 in multiple passes, where each pass can dispose the material at the height dimension of a portion (e.g., base portion 506 can be disposed at a first height dimension, and then extension portion 508 can be disposed on top of base portion 506 as having the triangular shape).

Figure 6:
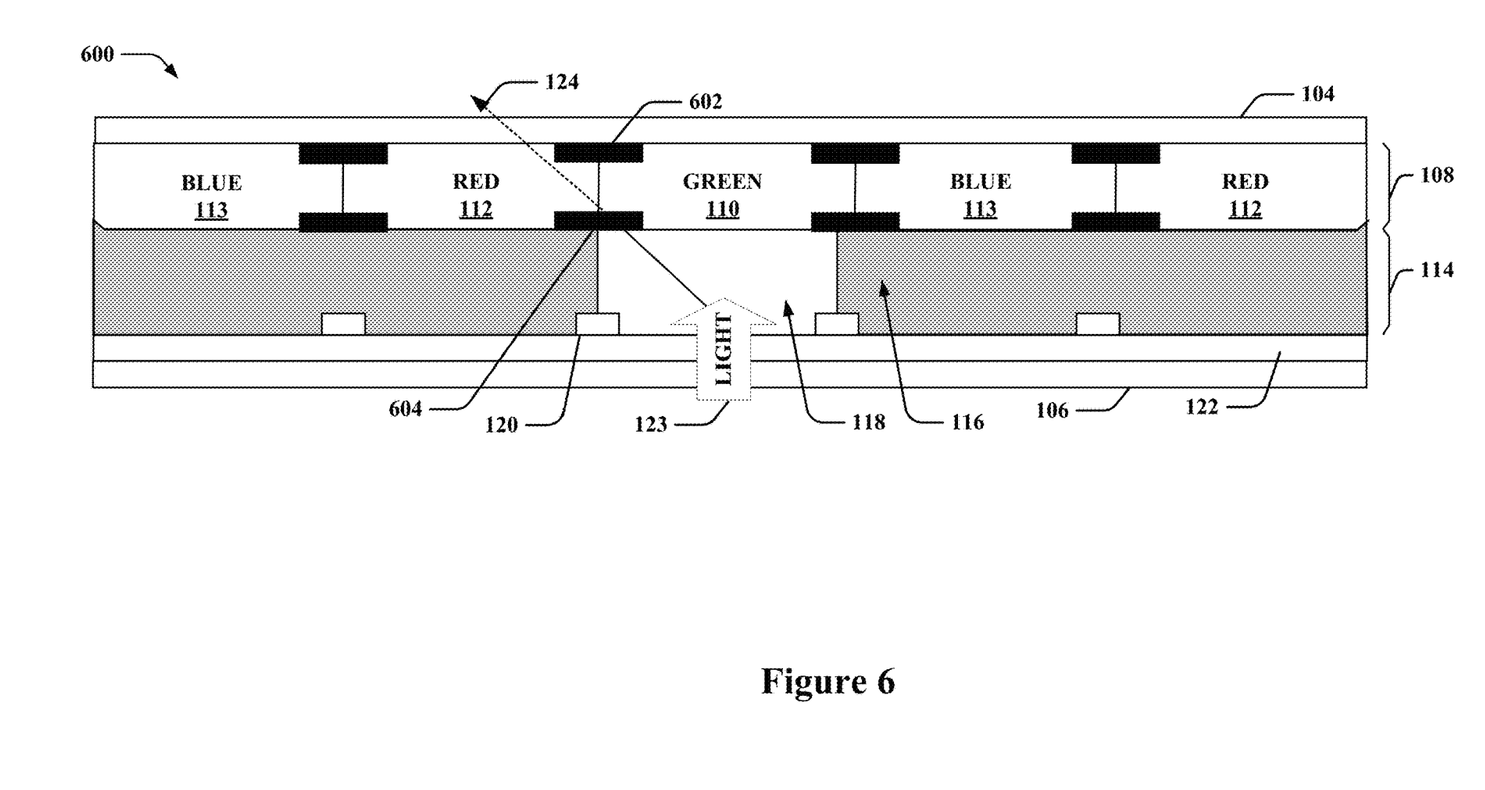
FIG. 6 illustrates a partial cross-section view of an additional example of a display panel with a black matrix layer constructed with separated first and second layers in accordance with examples described herein.

FIG. 6 illustrates a partial cross-sectional view of an additional example of a display panel 600 for a display device 150. Display panel 600 can include transparent layers 104, 106, color filter layer 108 having colored light filters 110, 112, 113, and liquid crystal layer 114 having chambers 116, 118, and electrodes 120, which are part of the electrode layer 122, as described above with respect to display panel 100 in FIG. 1.

Display panel 600 can include multiple, spaced apart (in height) black matrix layers 602, 604 that can be separately disposed respective to separate ends of the color filter layer 108 to block light path 124. For example, black matrix layer 602 can be disposed on transparent layer 104, and may have a single height along an entire width of the black matrix layer. The color filter layer 108 can then be disposed to fill in the colored light filters 110, 112. Another black matrix layer 604, which may be similar to black matrix layer 602 or which may have a different width, height, etc., can be disposed on the color filter layer 108 (e.g., spaced apart from black matrix layer 602) to achieve a structure similar to that of display panel 600, such that the black matrix layer 604 blocks light path 124 and/or other light paths. In one example, black matrix layer 604 can be disposed to align with black matrix layer 602 along a columnar axis of the color matrix formed by the color filter layer 108, as shown for display panel 600.

FIG. 7 illustrates a perspective view of an example of a portion of a transparent layer 700 (e.g., similar to transparent layer 104 in FIGS. 1-6) and a black matrix layer (or multiple black matrix layers) 702 (similar to black matrix layer 122 of FIG. 1) for use in a display panel in accordance with examples described herein. For example, the black matrix layer 702 can be disposed onto transparent layer 700 as a plurality of columnar members 704 that extend along the transparent layer 700 to define apertures 706, which can be filled with materials to create colored light filters of the color filter layer described above. In this regard, the columnar members 704 of the black matrix layer 702 can separate the two different colored light filters on a surface of the transparent layer 700. As described, the columnar members 704 of the black matrix layer 702 can each include a base portion 708, which can be similar to base portion 126 in FIG. 1, and an extension portion 710, which can be similar to extension portion 128 in FIG. 1, where the extension portion 710 can extend through a color filter layer disposed between the columnar members 704 (in apertures 706, as described).

In addition, the columnar members 704 may have one or more internal vertical walls 712, 714 that define one or more channels 716 in the columnar members 704. The channels 716 in a plurality of the columnar members 704 may be aligned in a direction perpendicular to the length of the columnar members 704 such that the channel 716 can be defined across the plurality of columnar members 704. In an example, liquid crystal can be disposed in the channels 716, which may include disposing the liquid crystal along a path defined by the channels 716 (e.g., and adjacent to the transparent layer 700). Thus, the black matrix layer 702 having columnar members 704 including one or more channels 716 may allow the liquid crystal material to flow between two or more apertures 706, which can help to reduce or eliminate contact pooling and/or edge pooling of the liquid crystal material. Additional or alternative structures of the black matrix layer 702 can be used based on one or more of the previously described structures or other similar structures.

FIG. 8 illustrates cross-section views of examples of constructing black matrix layers. FIG. 8 illustrates a portion 800 of a display panel before applying a process to modify a black matrix layer, and a portion 802 of the display panel after applying the process. For example, portion 800 of the display panel includes a transparent layer 804 (e.g., similar to transparent layers 104, 700 in FIGS. 1-7) and a black matrix layer 806. As described, the black matrix layer 806 can include a black-colored (or other colored) resinous layer, which may be formed of an insulating material (e.g., an organic insulating material or substantially any insulating material) that is able to block or at least substantially block light from a light source. In an example, black matrix layer 806 can have a height that is greater than or equal to a final height for the multiple portions 816, 818 of the black matrix layer 806, as described above. In addition, multiple layers 808, 810, 812 of materials can be used in a process applied to the black matrix layer 806 to create the multiple portions 816, 818 of the black matrix layer 806, where the multiple portions 816, 818 may have different heights and/or widths, where the heights and widths are relative to the transparent layer 804.

In an example, the process for constructing the black matrix layer portions 816, 818 from black matrix layer 806 can include photolithography where multiple layers 808, 810, 812 can be used in exposing ultraviolet (UV) light 814 to the black matrix layer 806 at varying exposure levels to achieve portions 816, 818. For example, the multiple layers 808, 810, and 812 can include a transparent layer 808 and multiple mask layers 810, 812, where the mask layers 810, 812 can be constructed as an inverse of the desired black matrix portions 816, 818. In addition, the multiple mask layers 810, 812 may include one or more halftone mask layers 810 that can allow a (continuous or variable) fraction of UV light 814 to pass to black matrix layer 806 and/or a metallic mask layer 812, such as a chromium layer, that allows substantially no UV light 814 to pass. Accordingly, using the photolithography process by applying UV light 814 over the multiple layers 808, 810, 812 can allow for forming multiple portions 816, 818 from black matrix layer 806. In an example, mask layers 810, 812 are shaped to achieve the structure of black matrix layer 122 in FIG. 1, but in other examples, different structures of mask layers 810, 812 can be used to achieve other black matrix layer structures described herein (e.g., the mask layers 810, 812 can be constructed as an inverse of a desired black matrix layer structure).

FIG. 9 is a flowchart of an example of a method 900 for creating a portion of a display device, such as display device 150, or associated display panel, such as display panels 100, 200, 300, 400, 500, 600, portions 800, 802, etc. shown above. For example, method 900 can be performed by one or more devices for forming layers of a display panel, which may include one or more material fabrication devices, one or more photolithographic devices, etc.

In method 900, at action 902, a black matrix layer can be disposed over a transparent layer. For example, using a suitable fabrication process, the black matrix layer material can be disposed on a transparent layer (e.g., material for black matrix layer 122, 202, 302, 402, 502, 602, 604, 706, etc. can be disposed on a transparent layer 104, 700, etc., which may be one of a plurality of transparent layers in a LCD panel). In an example, disposing the black matrix layer may include disposing a layer having a height greater than or equal to a desired height for the black matrix layer to be used in the LCD panel (e.g., where photolithography, etching, etc. can be used to modify the black matrix layer). In another example, disposing the black matrix layer may include disposing the base portion of the black matrix layer.

In method 900, at action 904, the black matrix layer can be modified to include at least a base portion and an extension portion. In contrast with conventional black matrix layers, the black matrix layers described herein can include the extension portion extending from the base portion and into a color filter layer in the height dimension to provide additional light path blocking. For example, the extension portion can have a same or different width as the base portion and a same or different height as the base portion to provide the additional light path blocking.

In an example, modifying the black matrix layer at action 904 may optionally include, at action 906, applying a halftone photolithographic process to form the base portion and the extension portion of the black matrix layer. For example, the black matrix layer disposed on the transparent layer may have a height and width of at least the final black matrix layer. As described in FIG. 8, for example, a photolithographic process can be applied to a black matrix layer, which can include applying UV light through a plurality of mask layers to achieve a structure with multi-dimensional height (e.g., base portion 816 and extension portion 818) that can extend into a color filter layer when the color filter layer is disposed.

In another example, modifying the black matrix layer at action 904 may optionally include, at action 908, separately disposing the extension portion of the black matrix layer. For example, the base portion can be disposed on the transparent layer as described (e.g., base portion 126, 206, 306, 406, 506, 816), and the extension portion (e.g., extension portion 128, 208, 308, 408, 508, 818) can be disposed on the base portion to achieve a structure with multi-dimensional height.

In another example, modifying the black matrix layer at action 904 may optionally include, at action 910, etching the black matrix layer to form the extension portion and the base portion. For example, the black matrix layer disposed on the transparent layer may be have a height and width of at least the final black matrix layer. The black layer matrix can then be etched (e.g., by laser or other etching mechanism) to achieve a structure with multi-dimensional height.

In method 900, at action 912, a color filter layer of a plurality of colored light filters can be disposed over the transparent layer and between the black matrix layer. For example, this can include disposing color tinted materials over the transparent layer and between the black matrix layer to allow passing of light from a light source (e.g., an LED or OLED backlight) through the colored light filters. The colored light filters may include colored light filters 110, 112 in FIGS. 1-6. In addition, this may include disposing two different colored light filters of a matrix of a plurality of colored light filters defining a color filter layer on the transparent layer and between the base portion and the extension portion of the black matrix layer.

Optionally at action 914 of method 900, a liquid crystal layer can be disposed over the color filter layer. For example, the liquid crystal layer can be disposed with chambers over the colored light filters of the color filter layer to control whether light from a light source can pass through the colored light filters. In one configuration, a data line can control a voltage or other property applied to the liquid crystal to modify a state of the liquid crystal thereby blocking or allowing passage of light to a corresponding colored light filter. In one example, disposing the liquid crystal layer may also include disposing uniform liquid crystal in a channel defined by the black matrix layer, where the uniform liquid crystal can be between colored light filters to allow the liquid to flow among the colored light filters.

Figure 10:
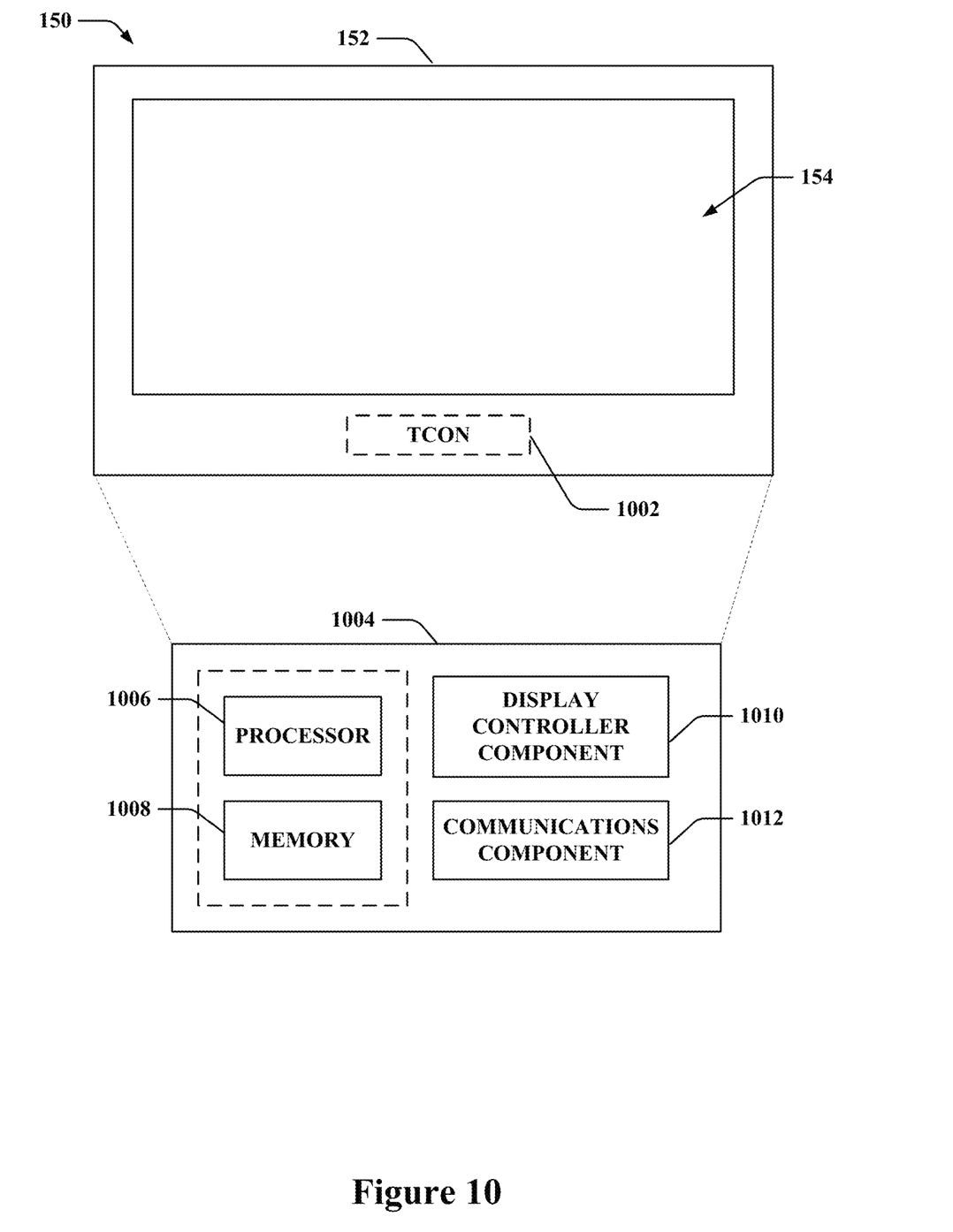
FIG. 10 is a schematic diagram of an example of a system for operating a display device constructed in accordance with examples described herein.

FIG. 10 illustrates an example of a display device 150 including housing 152 and display area 154, which may include one or more of the display panels 100, 200, 300, 400, 500, 600 (FIGS. 1-6) discussed above and/or similarly constructed display panels. The display device 150 may include an LCD display device, which may be a TFT display device that may include at least one TFT with an oxide active layer or a TFT with a poly-silicon active layer. In some examples, the TFT may include a gate electrode connected to the corresponding data line for receiving scanning signals to control the gate electrode to allow or prevent flow and/or structure of liquid crystal, as described. The display device 150 may also include a timing controller (TCON) 1002 for sending control signals to the TFT (e.g., through the electrodes 120) of the display panel for operating the on and off states of the liquid crystal corresponding to the pixels to display images in the display area 154 according to examples described herein.

In an example, display device 150 can include and/or can be coupled to a separable or non-separable computing device 1004, which may house or otherwise include a processor 1006, memory 1008, display controller component 1010, communications component 1012, etc. In an example, computing device 1004 can include other optional components in addition to those shown in FIG. 10. In one example, computing device 1004 may include processor 1006 for carrying out processing functions associated with one or more of components and functions described herein. Processor 1006 can include a single or multiple set of processors or multi-core processors. Moreover, processor 1006 can be implemented as an integrated processing system and/or a distributed processing system. Additionally, computing device 1004 may be or include a system-on-a-chip (SoC). Further, for example, computing device 1004 may include, but is not limited to, a desktop computer, a laptop computer, a tablet, a gaming device, a set top box or television controller, a media player, a mobile phone, or any other type of computing device.

Computing device 1004 may further include memory 1008, such as for storing local versions of applications being executed by processor 1006, related instructions, parameters, etc. Memory 1008 can include a type of memory usable by a computer, such as random access memory (RAM), read only memory (ROM), tapes, magnetic discs, optical discs, volatile memory, non-volatile memory, and any combination thereof. Additionally, processor 1006 and memory 1008 may include and execute instructions for operating display device 150, receiving touch input from display device 150 (e.g., in the form of user finger touch on a touch-sensitive controller of the display device 150), providing output on display device 150 (or display area 154), etc.

Further, computing device 1004 may include a display controller component 1010 for providing instructions to the display device 150 to display one or more images. Computing device 1004 may also include a communications component 1012 that provides for establishing and maintaining communications with one or more other input/output devices, other computing devices, parties, entities, etc. utilizing hardware, software, and services as described herein. Communications component 1012 may carry communications between components on computing device 1004, as well as between computing device 1004 and external devices, such as devices located across a communications network and/or devices serially or locally connected to computing device 1004. For example, communications component 1012 may include one or more buses, and may further include transmit chain components and receive chain components associated with a wireless or wired transmitter and receiver, respectively, operable for interfacing with external devices.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A display device, comprising:
   a transparent layer;
   a color filter layer adjacent to the transparent layer, wherein the color filter layer comprises a matrix of colored light filters, wherein one or more of the colored light filters may be of a different color;
   liquid crystal disposed on the color filter layer to define a liquid crystal layer; and
   a black matrix layer comprising a plurality of columnar members each having a base portion and an extension portion extending therefrom, each base portion disposed on the transparent layer between two different colored light filters in the matrix of colored light filters and each extension portion extending into the color filter layer between the two different colored light filters in the matrix of colored light filters, wherein the base portion and the extension portion differ in a height dimension that is substantially perpendicular to the transparent layer, wherein the extension portion of the plurality of columnar members defines a channel, wherein the channel extends through the extension portion of each of multiple columnar members of the plurality of columnar members, and wherein the channel is defined at least in part by the base portion, and wherein the channel is configured to allow the liquid crystal to flow through the channel.

2. The display device of claim 1, wherein the base portion has a first width and the extension portion has a second width, wherein the first width is different from the second width.

3. The display device of claim 1, wherein the extension portion extends at least halfway through the color filter layer.

4. The display device of claim 1, wherein the extension portion is aligned on the base portion respective to a center of a width of the base portion.

5. The display device of claim 1, wherein the transparent layer defines a first transparent layer, and wherein the liquid crystal layer is disposed between the color filter layer and a transparent thin film transistor (TFT) layer.

6. The display device of claim 5, further comprising a backlight configured to generate light through a second transparent layer toward the first transparent layer.

7. The display device of claim 6, wherein the backlight is a light emitting diode (LED) lamp or an organic LED (OLED) lamp.

8. The display device of claim 1, wherein the extension portion is at an off-center positon relative to a width of the base portion.

9. The display device of claim 1, further comprising a second black matrix layer disposed over the extension portion and over at least a portion of the matrix of colored light filters.

10. The display device of claim 1, wherein the extension portion extends beyond the color filter layer.

11. A method for constructing a display device, comprising:
   disposing a black matrix layer on a transparent layer, wherein the black matrix layer comprises an insulating material for blocking light;
   modifying the black matrix layer to include a plurality of columnar members each having at least a base portion having a first width and an extension portion, extending therefrom and having a second width, wherein the first width is different from the second width, wherein the extension portion of the plurality of columnar members defines a channel, wherein the channel extends through the extension portion of each of multiple columnar members of the plurality of columnar members, wherein the channel is configured to allow liquid crystal to flow through the channel, and wherein the channel is defined at least in part by the base portion;
   disposing two different colored light filters of a matrix of colored light filters to define a color filter layer on the transparent layer and between the plurality of columnar members of the black matrix layer; and
   disposing the liquid crystal on the matrix of colored light filters to define a liquid crystal layer.

12. The method of claim 11, wherein modifying the black matrix layer comprises applying a photolithographic process to the black matrix layer using a halftone mask layer and a metallic mask layer to form the extension portion and the base portion from the black matrix layer.

13. The method of claim 11, wherein modifying the black matrix layer comprises disposing the extension portion on top of the base portion.

14. The method of claim 11, wherein modifying the black matrix layer comprises etching the black matrix layer to generate the extension portion and the base portion.

15. The method of claim 11, wherein disposing the two different colored light filters to define the color filter layer comprises disposing materials to form the matrix of colored light filters on top of the base portion and adjacent to the extension portion, wherein the matrix of colored light filters extend between at least two portions of the black matrix layer disposed over the transparent layer.

16. The method of claim 11, wherein the extension portion extends at least halfway through the color filter layer to block an angular light path between adjacent colored light filters.

17. A computing device, comprising:
   at least one processor and a memory;
   a display panel, comprising:
      a transparent layer;
      a color filter layer adjacent to the transparent layer, wherein the color filter layer comprises a matrix of colored light filters, wherein one or more of the colored light filters may be of a different color;
      liquid crystal disposed on the color filter layer to define a liquid crystal layer; and
      a black matrix layer comprising a plurality of columnar members each having a base portion and an extension portion extending therefrom, each base portion disposed on the transparent layer between two different colored light filters in the matrix of colored light filters and each extension portion extending into the color filter layer between the two different colored light filters in the matrix of colored light filters, wherein the base portion and the extension portion differ in a height dimension that is substantially perpendicular to the transparent layer, wherein the extension portion of the plurality of columnar members defines a channel, wherein the channel extends through the extension portion of each of multiple columnar members of the plurality of columnar members, wherein the channel is configured to allow the liquid crystal to flow through the channel, and wherein the channel is defined at least in part by the base portion;

a thin film transistor (TFT) layer configured for controlling the liquid crystal associated with the matrix of colored light filters; and a display controller coupled to the at least one processor and configured to provide one or more images to the display panel.

18. The computing device of claim 17, wherein the base portion has a first width and the extension portion has a second width, wherein the first width is different from the second width.

19. The computing device of claim 17, wherein the extension portion extends at least halfway through the color filter layer.

20. The computing device of claim 17, wherein the extension portion is aligned on the base portion respective to a center of a width of the base portion.

* * * * *